US008884981B2

(12) United States Patent
Boettcher et al.

(10) Patent No.: US 8,884,981 B2
(45) Date of Patent: Nov. 11, 2014

(54) DYNAMICALLY RECONFIGURABLE GRAPHICS LAYER SYSTEM AND METHOD

(75) Inventors: Jesse W. Boettcher, San Jose, CA (US); Szu-Wen Huang, Fremont, CA (US); Gokhan Avkarogullari, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1250 days.

(21) Appl. No.: 11/899,026

(22) Filed: Sep. 4, 2007

(65) Prior Publication Data

US 2009/0058872 A1 Mar. 5, 2009

(51) Int. Cl.
*G09G 5/00* (2006.01)
*G06F 9/44* (2006.01)

(52) U.S. Cl.
CPC .................................. *G06F 9/4443* (2013.01)
USPC ......................................... 345/619; 345/501

(58) Field of Classification Search
USPC ................................................. 345/501, 619
See application file for complete search history.

(56) References Cited

U.S. PATENT DOCUMENTS

| | | | |
|---|---|---|---|
| 5,379,057 A | 1/1995 | Clough et al. | |
| 5,655,126 A * | 8/1997 | Glenning | 713/324 |
| 5,675,362 A | 10/1997 | Clough et al. | |
| 5,790,134 A * | 8/1998 | Lentz | 345/502 |
| 5,977,977 A * | 11/1999 | Kajiya et al. | 345/418 |
| 5,986,667 A * | 11/1999 | Jevans | 345/619 |
| 6,009,256 A * | 12/1999 | Tseng et al. | 703/13 |
| 6,016,151 A * | 1/2000 | Lin | 345/582 |
| 6,044,408 A * | 3/2000 | Engstrom et al. | 719/328 |
| 6,188,975 B1 * | 2/2001 | Gay | 703/22 |
| 6,212,489 B1 * | 4/2001 | Klein et al. | 703/13 |
| 6,356,862 B2 * | 3/2002 | Bailey | 703/16 |
| 6,389,379 B1 * | 5/2002 | Lin et al. | 703/14 |
| 6,415,384 B1 * | 7/2002 | Dave | 713/100 |
| 6,578,197 B1 * | 6/2003 | Peercy et al. | 717/143 |
| 6,622,287 B1 * | 9/2003 | Henkel | 716/105 |
| 6,636,214 B1 * | 10/2003 | Leather et al. | 345/422 |
| 6,856,951 B2 * | 2/2005 | Moona et al. | 703/22 |
| 7,002,599 B2 * | 2/2006 | Butcher | 345/619 |
| 7,146,581 B2 * | 12/2006 | Klein | 716/103 |
| 7,209,146 B2 | 4/2007 | Paquette | |
| 7,230,626 B2 * | 6/2007 | Hill et al. | 345/522 |

(Continued)

OTHER PUBLICATIONS

Masso' et al., Direct Manipulation of User Interfaces for Migration, Iui 2006, Jan. 29-Feb. 1, 2006, Acm, pp. 140-147.*

(Continued)

*Primary Examiner* — M Good Johnson
(74) *Attorney, Agent, or Firm* — Wong, Cabello, Lutsch, Rutherford & Brucculeri, LLP

(57) ABSTRACT

A method of displaying a user interface in a portable electronic device is provided. The method includes displaying a user interface via a graphics layer attached to a software renderer, detaching the graphics layer from the software renderer, and attaching the graphics layer to one or more of a plurality of hardware layers, such that the display of the graphics layer is facilitated by one or more features of at least one of the hardware layers. An electronic device is provided that includes a display, a processor coupled to the display and configured to provide a plurality of hardware layers, and a user interface comprising a graphics layer, wherein the display of the graphics layer is facilitated by one or more features of at least one of the hardware layers, wherein the graphics layer dynamically attaches to or detaches from one or more of the plurality of hardware layers.

23 Claims, 8 Drawing Sheets

(56) References Cited

U.S. PATENT DOCUMENTS

| | | | |
|---|---|---|---|
| 7,281,248 B2* | 10/2007 | Demsey et al. | 718/1 |
| 7,286,140 B2* | 10/2007 | Butcher | 345/626 |
| 7,302,689 B2* | 11/2007 | Miller et al. | 719/313 |
| 7,356,672 B2* | 4/2008 | Vahid et al. | 712/37 |
| 7,366,921 B2* | 4/2008 | Ranganathan | 713/300 |
| 7,395,521 B1* | 7/2008 | Ma et al. | 716/103 |
| 7,511,718 B2* | 3/2009 | Subramanian et al. | 345/619 |
| 7,571,385 B2* | 8/2009 | Miller et al. | 715/723 |
| 7,623,140 B1* | 11/2009 | Yeh et al. | 345/629 |
| 7,631,319 B2* | 12/2009 | Miller et al. | 719/328 |
| 7,680,898 B2* | 3/2010 | Rudolph | 709/217 |
| 7,757,240 B2* | 7/2010 | Miller et al. | 719/312 |
| 7,814,432 B2* | 10/2010 | Ashe et al. | 715/810 |
| 7,830,372 B2* | 11/2010 | Fry et al. | 345/419 |
| 7,831,805 B2* | 11/2010 | Doering et al. | 712/34 |
| 7,844,915 B2* | 11/2010 | Platzer et al. | 715/781 |
| 7,903,115 B2* | 3/2011 | Platzer et al. | 345/473 |
| 7,952,569 B2* | 5/2011 | Hunt et al. | 345/179 |
| 8,069,436 B2* | 11/2011 | Snyder et al. | 717/106 |
| 8,196,044 B2* | 6/2012 | Barrett | 715/718 |
| 2002/0163540 A1* | 11/2002 | Kishimoto | 345/762 |
| 2003/0043191 A1* | 3/2003 | Tinsley et al. | 345/762 |
| 2003/0169279 A1* | 9/2003 | Oberoi et al. | 345/643 |
| 2003/0184593 A1* | 10/2003 | Dunlop | 345/810 |
| 2003/0187662 A1* | 10/2003 | Wilson | 704/500 |
| 2004/0039862 A1* | 2/2004 | Hunt et al. | 710/304 |
| 2005/0231516 A1* | 10/2005 | Zimmer | 345/531 |
| 2005/0285965 A1 | 12/2005 | Zimmer et al. | |
| 2006/0048164 A1* | 3/2006 | Fry et al. | 719/328 |
| 2006/0139369 A1 | 6/2006 | Zimmer et al. | |
| 2006/0290703 A1* | 12/2006 | White et al. | 345/522 |
| 2007/0028023 A1* | 2/2007 | Rostampour et al. | 710/302 |
| 2007/0038939 A1* | 2/2007 | Challen et al. | 715/734 |
| 2007/0150589 A1* | 6/2007 | Kim et al. | 709/224 |
| 2007/0182747 A1* | 8/2007 | Harper et al. | 345/503 |
| 2007/0247468 A1* | 10/2007 | Zimmer | 345/531 |
| 2007/0288856 A1* | 12/2007 | Butlin et al. | 715/762 |
| 2008/0016491 A1* | 1/2008 | Doepke | 717/104 |
| 2008/0117204 A1* | 5/2008 | Thorn | 345/419 |

OTHER PUBLICATIONS

Styles et al., Proceedings from the 2000 IEEE Symposium on Field-Programmable Custom Computing Machines, Apr. 17, 2000-Apr. 19, 2000, pp. 77-87.*

* cited by examiner

| Screen Class | Menu-Half | Menu-Full | Background-Full | Foreground-Full | Now Playing | "Cover Flow" | Menu Showcase | Clock Full Screen | Menu Clock |
|---|---|---|---|---|---|---|---|---|---|
| Menu-Half | None | | | | | | | | |
| Menu-Full | | None | | | | | | | |
| Background-Full | Slide | | None | | | | | | |
| Foreground-Full | Fade | | | None | | | | | |
| "Now Playing" | | Fade | | | None | | | | |
| "Cover Flow" | Change Opacity | | | Slide | | Node | Fade | | |
| Menu Showcase | | | | | | | Fade | Change Opacity | |
| Clock-Full Screen | | | | | | | None | | |
| Menu-full | | | | | | | | None | None |

FIG. 8

DYNAMICALLY RECONFIGURABLE GRAPHICS LAYER SYSTEM AND METHOD

BACKGROUND OF THE INVENTION

1. Field of the Invention

The present invention relates generally to graphical user interfaces and more particularly to a graphical user interface for a portable electronic device.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The graphical user interface ("GUI") of an electronic device may accomplish a variety of tasks and present a variety of information to a user. The user sees and interacts with the GUI, so it is beneficial if the GUI presents information and choices to a user in a way that is not only pleasing and natural to the eye but conducive to efficient use of the underlying application and hardware. For example, a user may expect a certain amount of performance and responsiveness, in addition to a pleasing and natural interface.

One particular area that may greatly affect how a user perceives the interface is special effects, such as transitions, that may be used between different screens. A transition that is too jarring or abrupt may result in an unpleasant interface. Alternatively, a transition that is inefficient or poorly designed may be interpreted by the user as a slow or unresponsive user interface. Many special effects may be used as transitions to avoid these problems, such as fading screens in and out (changing opacity), sliding or moving screens in and out, scaling or resizing screens, etc.

However, as the demand for smaller portable electronic devices with a wide range of functionality increases, processing and memory resources may not be available and may constrain the ability of a device to provide these special effects. In addition, providing these special effects should not result in an accompanying decrease in speed or responsiveness of the user interface.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

A portable electronic device having a user interface is provided. In one embodiment, one or more graphics layers of the user interface may dynamically attach or detach to or from hardware layers. A graphics layer may also attach or detach to or from a software renderer. For various special effects, such as transitions between graphics layers, a graphics layer may attach to a specific hardware layer to facilitate execution of the special effect. In response to a user input or other input prompting a transition, a graphics layer may detach from a software renderer, attach to a hardware layer, execute the transition, and then detach from the hardware layer and attach to the software renderer.

In one embodiment, the user interface may include screens, templates, and UI components, such that a screen may include one or more templates, and a template may include one or more UI components. In addition, transitions may occur between screens sharing the same template. To allow UI components on a template to be displayed at the same time during the transition, each UI component may be cloned in memory such that identical clones having unique identifiers exist. An active clone may be updated with the properties of the entering or target screen of the transition, and an inactive clone may be displayed on the exiting or previous screen of the transition.

In another embodiment, screens may be classified into different screen classes. A transition between screens may be selected based on the classification of the entering or target screen and the exiting or previous screen.

In another embodiment, a menu having one or more list items is provided. Each list item may include different elements, such as text, graphics, or dynamic items. Each list item may include a layout that specifies properties for the elements of the list items, such as size, position, etc. All possible list item layouts are classified and stored in a flyweight object in memory, allowing list items to share layout information instead of storing a layout for each list item.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein:

FIG. 8 depicts a selection matrix that may be used to select a specific transition for a combination of screen classes of a user interface in accordance with an embodiment of the present invention;

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
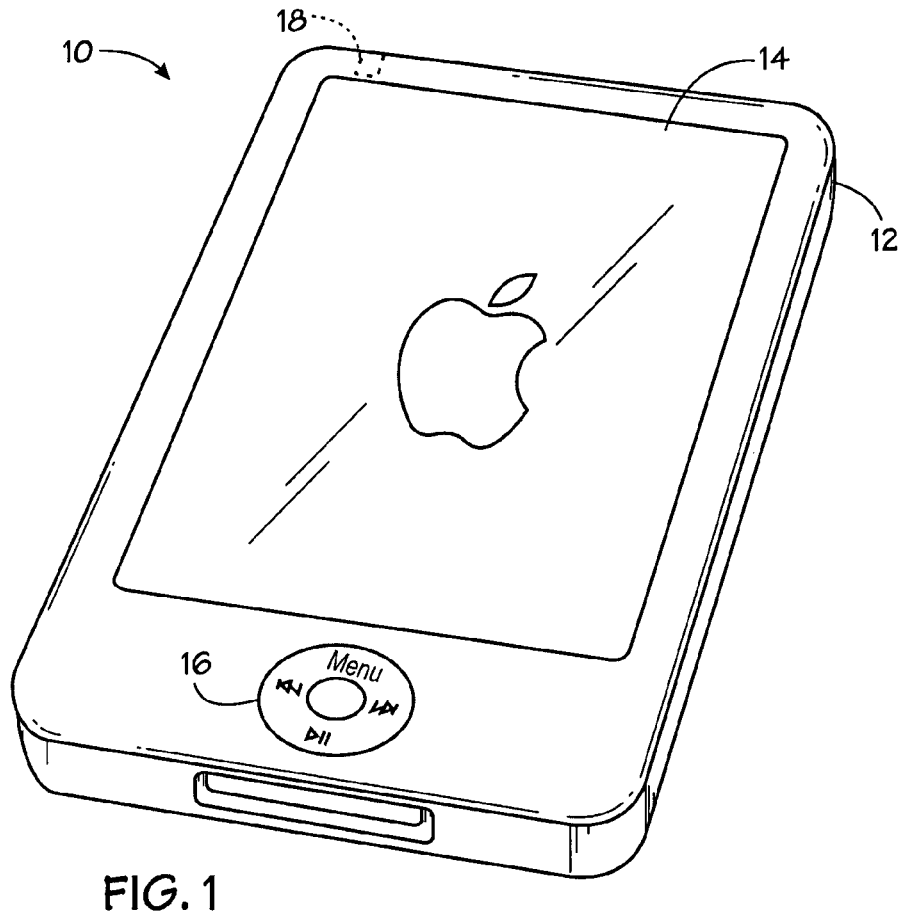
FIG. 1 is a perspective view illustrating an electronic device, such as a portable media player, in accordance with one embodiment of the present invention.

Turning now to the figures, FIG. 1 depicts an electronic device 10 in accordance with one embodiment of the present invention. In some embodiments, the electronic device 10 may be a media player for playing music and/or video, a cellular phone, a personal data organizer, or any combination thereof. Thus, the electronic device 10 may be a unified device providing any one of or a combination of the functionality of a media player, a cellular phone, a personal data organizer, and so forth. In addition, the electronic device 10 may allow a user to connect to and communicate through the Internet or through other networks, such as local or wide area networks. For example, the electronic device 10 may allow a user to communicate using e-mail, text messaging, instant messaging, or using other forms of electronic communication. By way of example, the electronic device 10 may be a model of an iPod® having a display screen or an iPhone® available from Apple Inc.

In certain embodiments the electronic device 10 may be powered by a rechargeable or replaceable battery. Such battery-powered implementations may be highly portable, allowing a user to carry the electronic device 10 while traveling, working, exercising, and so forth. In this manner, a user of the electronic device 10, depending on the functionalities provided by the electronic device 10, may listen to music, play games or video, record video or take pictures, place and take telephone calls, communicate with others, control other devices (e.g., the device 10 may include remote control and/or Bluetooth functionality, for example), and so forth while moving freely with the device 10. In addition, in certain embodiments the device 10 may be sized such that it fits relatively easily into a pocket or hand of the user. In such embodiments, the device 10 is relatively small and easily handled and utilized by its user and thus may be taken practically anywhere the user travels. While the present discussion and examples described herein generally reference an electronic device 10 which is portable, such as that depicted in FIG. 1, it should be understood that the techniques discussed herein may be applicable to any electronic device having a display, regardless of the portability of the device.

In the depicted embodiment, the electronic device 10 includes an enclosure 12, a display 14, user input structures 16, and input/output connectors 18. The enclosure 12 may be formed from plastic, metal, composite materials, or other suitable materials or any combination thereof. The enclosure 12 may protect the interior components of the electronic device 10 from physical damage, and may also shield the interior components from electromagnetic interference (EMI).

The display 14 may be a liquid crystal display (LCD) or may be a light emitting diode (LED) based display, an organic light emitting diode (OLED) based display, or other suitable display. In accordance with certain embodiments of the present technique, the display 14 may display a user interface as well as various images 15, such as logos, avatars, photos, album art, and so forth. Additionally, in one embodiment the display 14 may be a touch screen through which a user may interact with the user interface. The display 14 may also display various function and/or system indicators to provide feedback to a user, such as power status, call status, memory status, etc. These indicators may be in incorporated into the user interface displayed on the display 14.

In one embodiment, one or more of the user input structures 16 are configured to control the device 10, such as by controlling a mode of operation, an output level, an output type, etc. For instance, the user input structures 16 may include a button to turn the device 10 on or off. In general, embodiments of the electronic device 10 may include any number of user input structures 16, including buttons, switches, a control pad, keys, knobs, a scroll wheel, or any other suitable input structures. The input structures 16 may work with a user interface displayed on the device 10 to control functions of the device 10 or of other devices connected to or used by the device 10. For example, the user input structures 16 may allow a user to navigate a displayed user interface or to return such a displayed user interface to a default or home screen.

The electronic device 10 may also include various input and output ports 18 to allow connection of additional devices. For example, a port 18 may be a headphone jack that provides for connection of headphones. Additionally, a port 18 may have both input/output capabilities to provide for connection of a headset (e.g. a headphone and microphone combination). Embodiments of the present invention may include any number of input and/or output ports, including headphone and headset jacks, universal serial bus (USB) ports, Firewire or IEEE-1394 ports, and AC and/or DC power connectors. Further, the device 10 may use the input and output ports to connect to and send or receive data with any other device, such as other portable electronic devices, personal computers, printers, etc. For example, in one embodiment the electronic device 10 may connect to a personal computer via a Firewire or IEEE-1394 connection to send and receive data files, such as media files.

Figure 2:
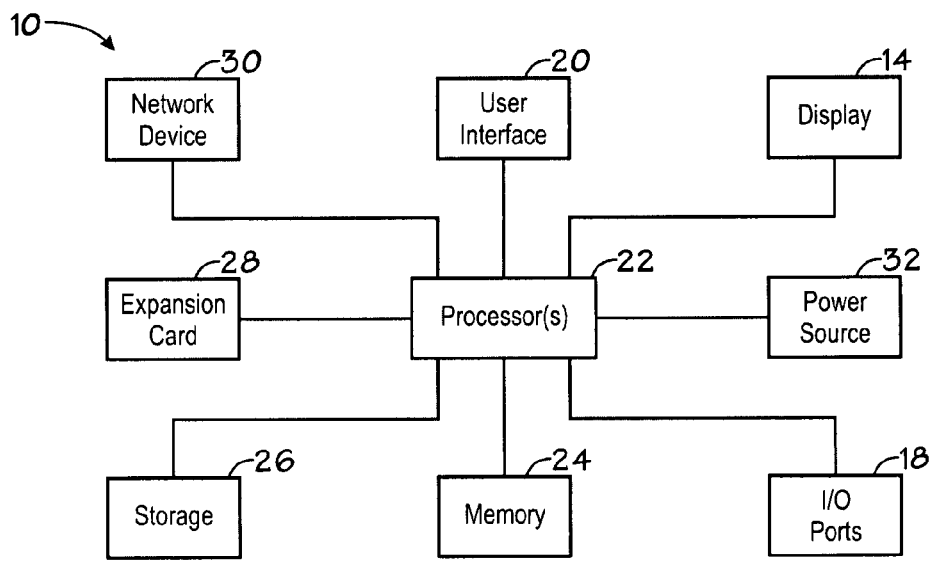
FIG. 2 is a simplified block diagram of the portable media player of FIG. 1 in accordance with one embodiment of the present invention.

Turning now to FIG. 2, a block diagram of components of an illustrative electronic device 10 is shown. The block diagram includes the display 14 and I/O ports 18 discussed above. In addition, the block diagram illustrates the user interface 20, one or more processors 22, a memory 24, storage 26, card interface(s) 28, networking device 30, and power source 32.

As discussed herein, in certain embodiments the user interface 20 may be displayed on the display 14, and may provide a means for a user to interact with the electronic device 10. The user interface may be a textual user interface, a graphical user interface (GUI), or any combination thereof, and may include various layers, windows, screens, templates, elements or other components that may be displayed in all of or areas of the display 14.

The user interface 20 may, in certain embodiments, allow a user to interface with displayed interface elements via the one or more user input structures 16 and/or via a touch sensitive implementation of the display 14. In such embodiments, the user interface provides interactive functionality, allowing a user to select, by touch screen or other input structure, from among options displayed on the display 14. Thus the user can operate the device 10 by appropriate interaction with the user interface 20.

The processor(s) 22 may provide the processing capability required to execute the operating system, programs, user interface 20, and any other functions of the device 10. The processor(s) 22 may include one or more microprocessors, such as one or more "general-purpose" microprocessors, a combination of general and special purpose microprocessors, and/or ASICS. For example, the processor(s) 22 may include one or more reduced instruction set (RISC) processors, such as a RISC processor manufactured by Samsung, as well as graphics processors, video processors, and/or related chip sets.

Embodiments of the electronic device 10 may also include a memory 24. The memory 24 may include a volatile memory, such as RAM, and a non-volatile memory, such as ROM. The memory 24 may store a variety of information and may be used for a variety of purposes. For example, the memory 24 may store the firmware for the device 10, such as an operating system for the device 10 and/or any other programs or executable code necessary for the device 10 to function. In addition, the memory 24 may be used for buffering or caching during operation of the device 10.

The device 10 in FIG. 2 may also include non-volatile storage 26, such as ROM, flash memory, a hard drive, any other suitable optical, magnetic, or solid-state storage medium, or a combination thereof. The storage 26 may store data files such as media (e.g., music and video files), software (e.g., for implementing functions on device 10), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that maintains a record of podcasts or television shows or other media a user subscribes to), telephone information (e.g., telephone numbers), and any other suitable data.

The embodiment in FIG. 2 also includes one or more card slots 28. The card slots 28 may receive expansion cards that may be used to add functionality to the device 10, such as additional memory, I/O functionality, or networking capability. The expansion card may connect to the device 10 through any type of connector and may be accessed internally or externally to the enclosure 12. For example, in one embodiment the card may be a flash memory card, such as a SecureDigital (SD) card, mini- or microSD, CompactFlash card, Multimedia card (MMC), etc. Additionally, in some embodiments a card slot 28 may receive a Subscriber Identity Module (SIM) card, for use with an embodiment of the electronic device 10 that provides mobile phone capability.

The device 10 depicted in FIG. 2 also includes a network device 30, such as a network controller or a network interface card (NIC). In one embodiment, the network device 30 may be a wireless NIC providing wireless connectivity over any 802.11 standard or any other suitable wireless networking standard. The network device 30 may allow the device 10 to communicate over a network, such as a LAN, WAN, MAN, or the Internet. Further, the device 10 may connect to and send or receive data with any device on the network, such as other portable electronic devices, personal computers, printers, etc.

For example, in one embodiment, the electronic device 10 may connect to a personal computer via the network device 30 to send and receive data files, such as media files. Alternatively, in some embodiments the electronic device may not include a network device 30. In such an embodiment, a NIC may be added into card slot 28 to provide similar networking capability as described above.

The device 10 may also include or be connected to a power source 32. In one embodiment, the power source 32 may be a battery, such as a Li-Ion battery. In such embodiments, the battery may be rechargeable, removable, and/or attached to other components of the device 10. Additionally, in certain embodiments the power source 32 may be an external power source, such as a connection to AC power and the device 10 may be connected to the power source 32 via the I/O ports 18.

Turning now in more detail to the user interface 20, the user interface 20 may of any suitable design to allow interaction between a user and the device 10. Thus, the user interface 20 may provide windows, menus, graphics, text, keyboards or numeric keypads, scrolling devices, or any other elements. In one embodiment, the user interface 20 may include screens, templates, and UI components, and may include or be divided into any number of these or other elements. The arrangement of the elements of user interface 20 may be hierarchical, such that a screen includes one or more templates, a template includes one or UI components. It should be appreciated that other embodiments may arrange user interface elements in any hierarchical or non-hierarchical structure and still utilize the techniques discussed herein.

A screen may be displayed on all or a portion of the display 20 and, thus, may comprise the entire user interface 20 or only a portion of the user interface 20. The user interface 20 may include any number of screens of the same or different configurations and/or sizes. According to an embodiment using a hierarchical arrangement of elements, a screen may include one or more templates. Templates may be reused by different screens and may have properties associated with each template that affect the use and display of that template. Further, a screen may affect display of a template by overriding such properties and customizing a template for a particular use.

A template may include several user interface (UI) components, and a set of UI components may collectively form a template. Each UI component may also include properties that define how that component is displayed, such as the model from which data for the component is collected, the property identification of data, position, width, height, background color, etc. A UI component may be any type of element useful for display on the user interface 20, such as single or multi-line text fields, progress bars, bitmaps or any other image, power status indicator, lists, etc.

In conjunction with such a hierarchical arrangement of user interface elements, elements may be divided into classes. For example, in one embodiment, screens may be classified into screen classes, wherein each screen class represents a general layout of the templates that comprise the screen. For example, the screen classes may include a menu-half screen, a menu-full screen, a background-full screen, a foreground-full screen, a "Now Playing" screen, a "cover flow" screen, a menu showcase screen, a clock-full screen, a menu clock, and so forth, each of which have different layouts of templates.

As the user interface 20 in such an embodiment may include any number of screens, templates, and UI components, various elements can be added or removed from the user interface as needed. For example, selection of an item from a menu screen may prompt display of another screen, or selection of a different function may prompt removal of one screen and insertion of another. Such actions may be referred to as transitions, and such transitions may be a subset of a larger category of user interface actions known as special effects.

Special effects may include any number of visual or non-visual actions on a user interface, such as fading or changing opacity, sliding or moving, resizing or scaling, blurring, rotating, pseudo-coloring, etc. Thus a transition may be a special effect in which these actions of changing opacity, resizing, moving, etc., are used to facilitate the addition and removal of screens, templates, UI components or any other element to or from the user interface 20. In one embodiment, a transition may include moving one screen, template, or UI component off of the user interface 20 and moving another screen, window, template, or UI component onto the user interface 20. In such a transition between screens, for example, the entering screen may be referred to as the "target" screen, and the exiting screen may be referred to as the "previous" screen.

To facilitate execution and display of the user interface 20, the user interface may be abstracted into different graphics layers. Graphics layers may be defined such that a graphics layer includes one or more elements of the user interface 20. A graphics layer may include properties to control how the graphics layer and the elements included in that graphics layer are used in the user interface 20 and/or displayed on the display 22. Further, as discussed further below, the graphics layer abstraction may advantageously provide for utilization of the software or hardware included in the device 10 for display of the user interface 20.

Turning now to the processor(s) 22, one or more of the processor(s) 22 may provide various features for use by the user interface 20. For example, a processor 22 may provide a plurality of hardware layers that may be used to display screens, templates, and/or UI components of the user interface 20. According to an embodiment using the graphics layer abstraction discussed above, each hardware layer may be utilized by one or more graphics layer in the user interface 20. Alternatively, instead of utilizing the features provided by the processor(s) 22, the graphics layers may utilize a software renderer to display the screens, templates, and UI components of the user interface 20.

In some embodiments, the hardware layers and software renderer may each provide different advantages to the user interface 20, such as by providing different or faster execution of special effects for manipulating the screens, templates, and elements that comprise the user interface 20. For example, in one embodiment, the hardware layers may include a set of LCD controller registers that can be used to specify various parameters for a user interface component. In such an embodiment, the parameters may include the position on the display 14, the location in the memory 16, and the stride, i.e. the width of each line. The hardware layers may also provide a global opacity parameter that affects an entire layer, and may include a setting to determine if a layer is active (visible). However, in certain implementations, use of the hardware layers provided by the processor(s) 22 may result in increased power consumption by the device 10. Thus, in such implementations, use of the software renderer may be preferred to extend battery life of a device 10.

In one embodiment, the hardware layers may include a set of layers referred to as layers G0, G1, . . . Gn. In such an embodiment, different layers may include different functions and/or properties. In an embodiment having layers G0-G3 and video, for example, layers G0 and G1 may include 90-degree hardware rotators providing for rotation of a layer when the device 10 and display 14 are rotated from a "portrait" to a "landscape" orientation. Layers G2 and G3 may not have hardware rotators, but may provide other properties or functions to provide for faster special effects in the user interface 20, such as opacity change or transitional movements for example. Different hardware layers may also utilize different pixel formats. For example, in one embodiment, a video layer may utilize YCbCr color format while the G0, G1, G2, and G3 layers may utilize a RGB pixel format.

Due to the different advantages of the different hardware layers and of the software renderer, the various special effects, such as transitions, and other functions implemented by the portable electronic device 10 may be provided or executed faster or more efficiently by one or more of the hardware layers or by software renderer. For example, for certain images or transitions, the hardware layers may provide faster resizing, moving, opacity changes, scaling, blurring, and/or pseudo-coloring for images, screens, templates, UI components, or other elements of the user interface 20. However, in such implementations, for other effects or images, such as for images below a certain size threshold, the software renderer may provide faster or more efficient execution.

Figure 3:
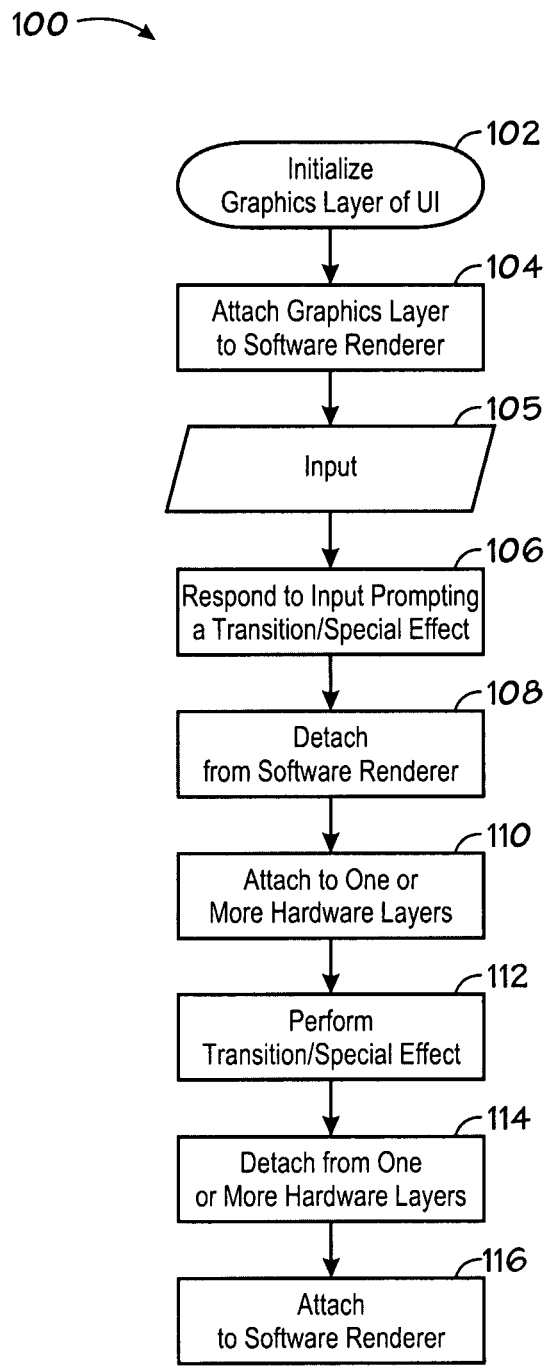
FIG. 3 is a flowchart depicting dynamically reconfigurable graphics layers in accordance with an embodiment of the present invention.

As the hardware layers and software renderer may each provide different advantages, one embodiment of the present technique provides a dynamically reconfigurable graphics layer abstraction to better utilize these advantages. FIG. 3 illustrates one example of a process 100 in which one or more graphics layers of a user interface 20 dynamically attaches and detaches to one or more hardware layers and/or to a software renderer. In this example, a graphics layer of the user interface 20 is first initialized (block 102), such as if the device 10 is switched on from an off state, or if the device 10 is activated after a suspended or hibernating state.

As discussed above, a user interface 20 may include multiple graphics layers, and while the process 100 depicts the process for a single graphics layer for the purpose of explanation, the process may be applied to multiple graphics layers of a user interface 20. In the depicted example, the graphics layer is attached to a software renderer (block 104) such that the graphics is not utilizing any of the hardware layers. In one embodiment, the software renderer is a software compositing pipeline, such as implemented in an iPod® or an iPhone® available from Apple Inc. In such an embodiment, the software compositing pipeline facilitates display of the graphics layer on the display 14.

The process 100 may receive an input 105 that invokes (block 106) the use of a special effect, such as a transition. The input 105 may be in response to an interaction between a user and the user interface 20, such as selection of a menu item from the user interface 20. Alternatively, the input 105 may be in response to a non-user initiated action, such as an incoming call, text message, network message or alert, power message or alert, or any other action.

The invoked special effects may include transitions, display of images, videos, or any other effect displayed in the user interface 20. To facilitate execution of a special effect by utilizing one or more hardware layers, the graphics layer may be detached from the software renderer (block 108). The graphics layer is then attached to one or more of the hardware layers (block 110). In other words, one or more the hardware layers G0, G1, G2, G3 and video are utilized to perform the special effect and, once the effect is performed, control of the graphics layers returns to the software renderer.

In some embodiments, the attachment of the graphics layer to the hardware layer may require additional conversions, calculations, or other transformations so that the graphics layer displays consistently on the user interface 20. For example, the attachment may require a color format conversion if the hardware layer or layers being attached to uses a YCbCr color format and the software renderer uses an RGB color format. Additionally, recalculation of coordinates may be required if the software renderer and the one or more respective hardware layers represent position on the display 14 using different coordinate schemes.

Once the graphics layer is attached to one or more hardware layers, the special effect, such as a transition, may be performed (block 112) and is facilitated by the specific functionality provided by the hardware layer, such as increased speed, decreased memory utilization, hardware enhanced effects such as opacity, rotation, and so forth. For example, if the transition includes fading in and out, such as by changing opacity of various user interface screens, then the hardware layer may execute such a transition faster than the software renderer.

As discussed above, hardware layers provided by the microprocessor(s) 22 may provide various features, such as rotators, scalars, etc. Thus, it may be advantageous to use a specific hardware layer for a specific type of special effect. In one embodiment, the hardware layer selected for a specific special effect may be preselected during the design of the user interface 20. Thus, for a specific special effect, a lookup table or other stored association may be used to select the appropriate hardware layer for that special effect. Alternatively, in other embodiments, the hardware layers may be dynamically allocated by software. For example, for a specific special effect, the first available hardware layer capable of executing the special effect may be allocated by software to a graphics layer, such that hardware layers are allocated as needed.

Once the special effect is completed, such as by the completion of a transition from one user interface screen to another, the graphics layer can then detach from the hardware layer (block 114) and then attach to the software renderer (block 116) and return to using software rendering to display the user interface 20. In such an implementation, detaching the graphics layer from the hardware layer and reattaching the graphics layer to the software renderer may free the hardware layer and/or the processor(s) 22 for other purposes and may minimize the power consumption of the device 10.

Figure 4A:
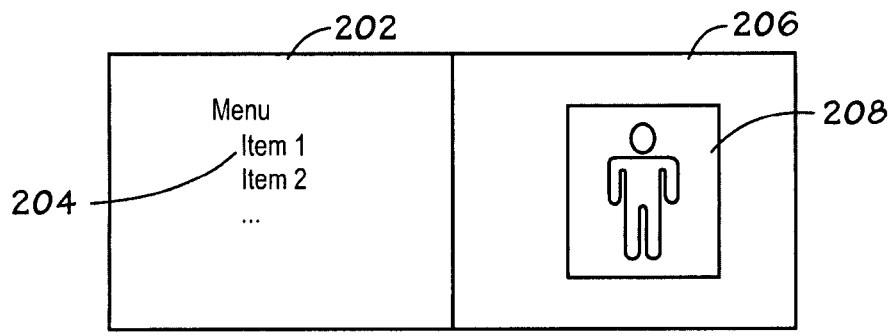
FIGS. 4A-D depict a simplified series of screens of a user interface illustrating a dynamically reconfigurable graphics layer according to an embodiment of the present invention.

With the foregoing discussion in mind, FIG. 4A depicts a series of simplified screen depictions of a user interface 20 illustrating a dynamically reconfigurable graphics layer according to an embodiment of the present invention. In FIG. 4A, the user interface 20 is split into two screens, the left screen 202 depicting a list of menu items 204, and the right screen 206 depicting an image 208. The graphics layers displaying the screens 202, 206 are initially attached to the software renderer. A user may initiate a transition in the user interface by, for example, selecting a menu item from the list of menu items 204. After receiving this selection, the graphics layers providing the two screens 202 and 206 may attach to one or more hardware layers to utilize the features of those hardware layers while executing a transition.

Figure 4B:
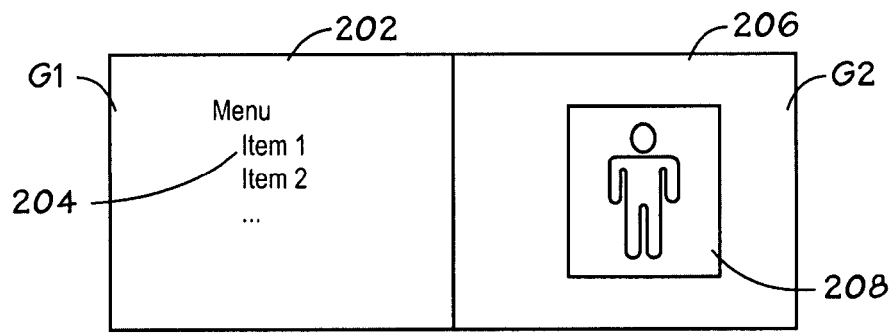

For example, referring now to FIG. 4B, in an embodiment that includes hardware layers G0, G1, G2, G3 and Video, the graphics layer associated with left screen 202 may attach to hardware layer G1 and the graphics layer associated with right screen 206 may attach to hardware layer G2. These hardware layers may provide features that facilitate, enhance, or accelerate the specific transition that will occur. Further, as discussed above, the selection of the transition may be predetermined or the selection may occur "on-the-fly" via software allocation. As part of the transition, a third screen 210 associated with its own graphics layer may be attached to yet another hardware layer, such as the Video layer, as seen in FIGS. 4C and 4D.

Figure 4C:
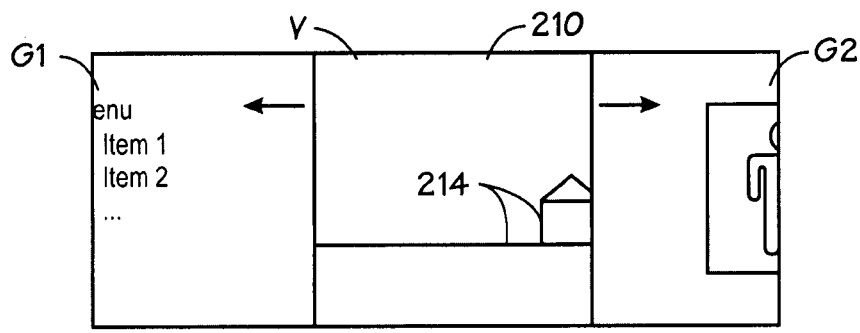

After the graphics layers have attached to respective hardware layers, the transition, such as a sliding transition, occurs as depicted in FIG. 4C. Current screens 202 and 206 "slide out" in direction of arrows revealing screen 210 that is a "background" screen or video layer. As can been seen in FIG. 4C, a third screen 210 that includes image 214 appears as the screens 202 and 206 slide out of the user interface 20. Display of the third screen 210 is facilitated by the Video hardware layer, which may be allocated to the graphics layer of screen 210 as discussed above.

Figure 4D:
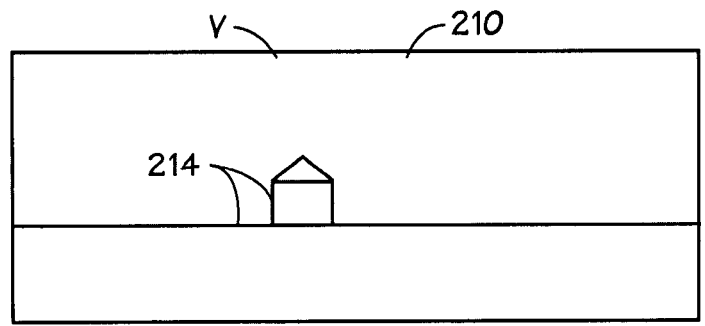

As depicted in FIG. 4D, the transition is complete when screens 202 and 206 are no longer displayed on user interface 20 and when the third screen 210 is fully displayed on user interface 20. At this point, the graphics layers of screens 202, 206, and 210 may detach from hardware layers G1, G2, and Video respectively. The graphics layers of third screen 210 may attach to the software renderer; alternatively, if further special effects will occur that may utilize the features of hardware layer Video, the graphics layer of screens 210 may remain attached to the hardware layer Video to facilitate faster execution of those special effects.

Figure 5:
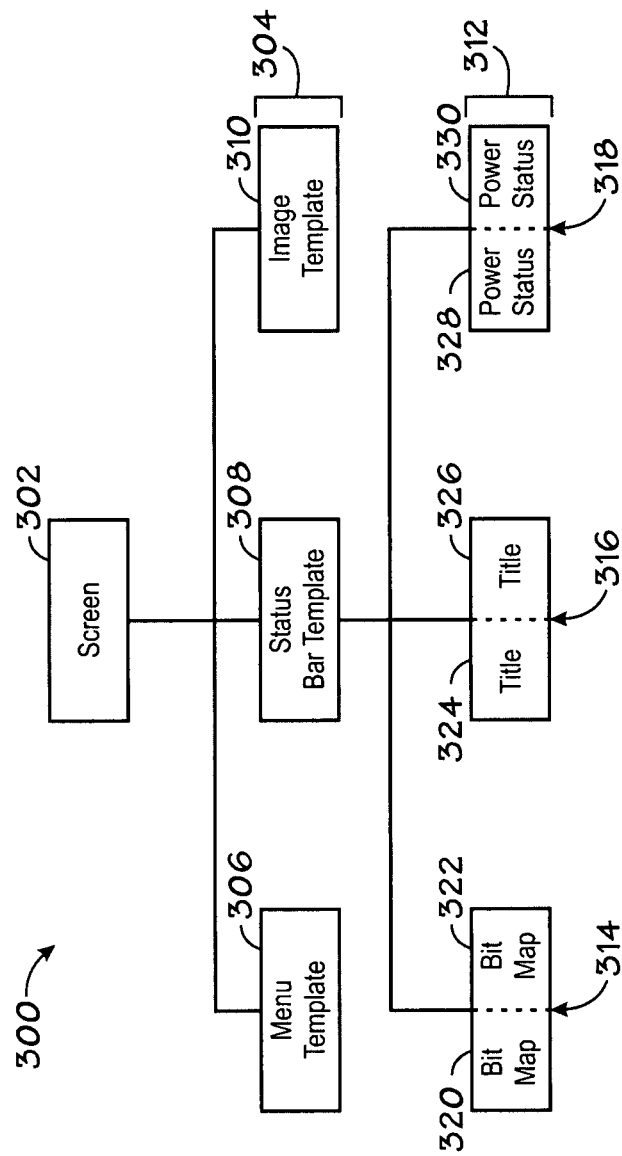
FIG. 5 is a block diagram depicting a hierarchy of components of one embodiment of a user interface in accordance with an embodiment of the present invention.

Turning now to other aspects of a user interface 20 for use with a portable electronic device 10, FIG. 5 depicts a block diagram 300 of a hierarchy of elements of one embodiment of a user interface 20. As mentioned above, other embodiments may arrange user interface elements in any hierarchical or non-hierarchical structure. Further, the diagram depicted in FIG. 5 is a simplified diagram illustrating only some elements of an embodiment of a user interface 20, and other elements may be included or excluded.

The top level of the block diagram of FIG. 5 is a screen 302. In one embodiment, a screen 302 may include one or more templates 304, such as a menu template 306, a status bar template 308, and an image template 310. The templates 304 may be reused by different screens, and may have properties associated with each template that affect the use and display of that template. Further, as illustrated in FIG. 5, a template may include one or more UI components 312. For example, in FIG. 5, the status bar template 308 is depicted as including UI components 312 such as a bitmap 314, a title 316, and a power status indicator 318.

As will be discussed below in FIGS. 6 and 7, to facilitate transitions between screens, templates, and other elements, each UI component 312 may be cloned such that two identical clones of each UI component 312 exist in the memory of the device 10, each with a unique identifier. For example, in FIG. 5 each UI component 312 is divided into two identical clones. Thus, bitmap 314 is divided into two clones 320 and 322, title 316 is divided into two clones 324 and 326, and the power status indicator 318 is divided into clones 328 and 330.

As each UI component 312 has two clones, one clone may be designated as an "active" clone, and the other clone may be designated as an "inactive" clone. The active clone is the UI component that is modified and drawn on an entering or target screen during a transition, while the inactive clone is the UI component previously displayed on the exiting or previous screen of a transition.

For example, a user may enter an input from a first screen that results in a second screen being transitioned into the user interface 20. Because the second screen may also use the status bar template 308 and the corresponding UI components, the transition between the two screens may require the UI components comprising the status bar template 308 to be displayed at the same time, both for the entering or target screen and for the exiting or previous screen. Thus, cloning of the UI components 312 allows for two UI components to be displayed at the same time. Further, because two UI components 312 are available in memory, one UI component clone may be modified based on the entering or target screen by changing the properties discussed above, in preparation for the transition, yet the other clone may remain unchanged on the display.

Figure 6:
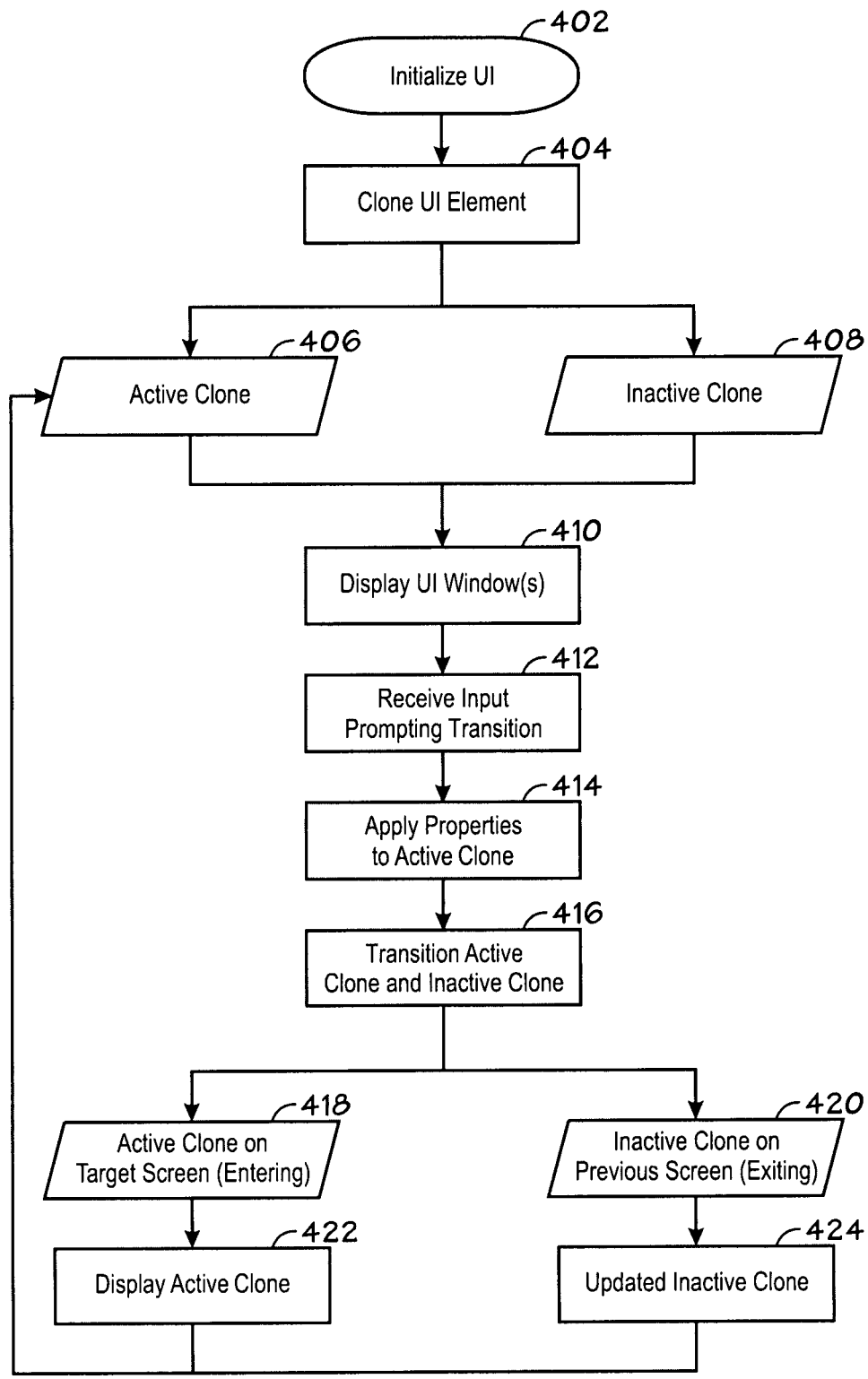
FIG. 6 is a flowchart of one embodiment of a process for a transition between clones of a user interface element in accordance with an embodiment of the present invention.

FIG. 6 depicts a flowchart of one embodiment of a cloning UI components process 400. Turning now to the flowchart, the user interface may be initialized (block 402), such as by turning on the portable electronic device 10. A UI component for a template, such as the bitmap 314, title 316, and power status indicator 318 components shown in FIG. 5 is copied to create identical clones each having unique identifiers (block 404), i.e., active clone 406 and inactive clone 408. One or more screens using a template and corresponding UI components are displayed (block 410) in the display of the device 10, and the inactive clone 408 of a UI component is displayed. Next, the user interface may receive an input, such as a user selection of a menu item, prompting a transition to a target screen (block 412). Alternatively, the input may be a non-user initiated item, such as an incoming phone call, text message, email, network message or alert, etc.

Upon receiving the input that prompts a transition, the properties for the UI component for the target screen are applied to the active clone 406 (block 414), while the inactive clone 508 remains on the exiting or previous screen. The transition between the exiting or previous screen and the entering or target screen then occurs (block 416) and includes the transition between the inactive clone 408 and the active clone 406. During the transition, the active clone 406 and inactive clone 408 are displayed on the target screen and previous screen respectively(blocks 418 and 420). After the transition is complete, the active clone 406 with the updated properties for the target screen is displayed on the user interface (block 422). The inactive clone 408 is then updated by applying the properties of the active clone 406 to the inactive clone 408 (block 424), such that both clones of the UI component are once again identical. As shown by line 426, the process then returns to the original state of two identical clones in memory, one active and one inactive, and is ready for the further screen transitions.

To further illustrate the process depicted in FIG. 6, a simplified transition between clones of an element of a user interface is depicted in FIGS. 7A-7E. The left column illustrates the properties of the clones in memory, and the right column is the user interface 20 as displayed on a display 14. For illustrative purposes, the transition is divided into steps, and each step in the transition is identified as t0, t1, t2, etc. Beginning with t0 in FIG. 7A, two clones 504 and 506 of a "title" UI component 507 are depicted in column 500. Each clone is stored in memory with a unique identifier, so that each clone may be identified and manipulated separately. In one implementation, the first clone 504 may be designated as the active clone, while the second clone 506 may be designated as the inactive clone. Initially, each clone is identical, as illustrated by the value "TITLE1," indicative of the value of a property for each clone.

At t0, right column 502 displays a simplified user interface 508 having two screens 510 and 512. The first screen 410 includes the title component, and thus may be a template that includes a title component, such as the status bar template 308. Other UI components may be included in screen 510 but are not shown in the simplified illustration of FIG. 6. The second screen 512 may also include any number of templates and UI components. At t0 of the transition, the screen 510 displays the inactive clone 506.

Figure 7A:
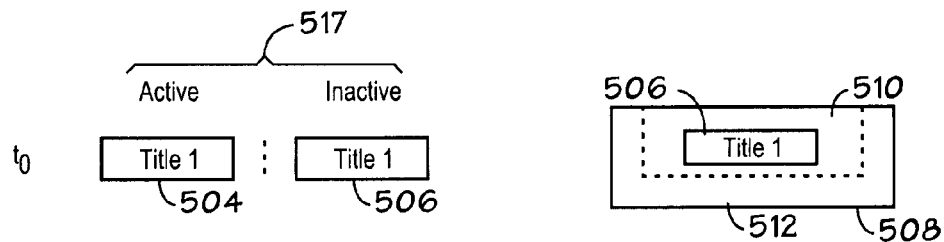
FIGS. 7A-E depict simplified diagrams of a transition between clones of a user interface element in accordance with an embodiment of the present invention.
Figure 7B:
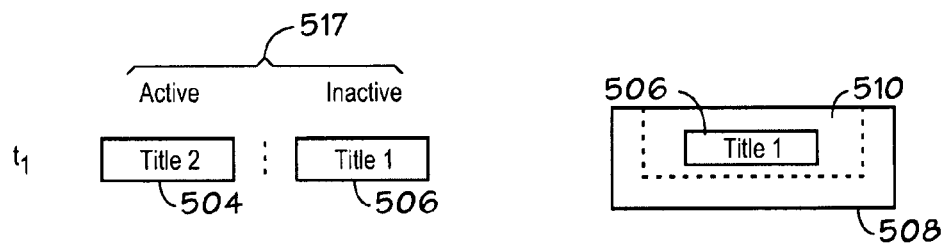

Turning to FIG. 7B, at t1, the user interface 508 may receive input, such as a selection from a user, prompting a transition to occur. The transition may utilize a target screen using the same status bar template 306 and the title component 507. However, as discussed above, the new incoming screen may include components of the status bar template 306 having different properties. Thus, the properties of the title component 507 may be modified on the target screen for display in the user interface 508. As illustrated in FIG. 7B, these modifications are applied to the active clone 504. Thus, at t1 in FIG. 7B, the active clone, 504 has been updated to have value "TITLE2." The inactive clone retains the value "TITLE1," as the screen 510 displaying the inactive clone 506 is still viewable on the user interface 508.

Figure 7C:
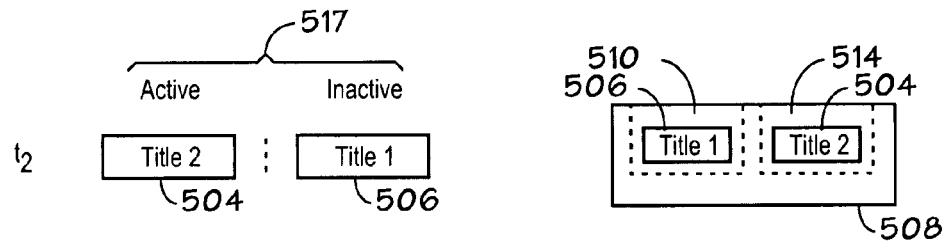

At t2 in FIG. 7C, the transition between the previous screen 510 and the target screen 514 occurs. The screen 510, the exiting screen, is transitioned off of the user interface 508, and the incoming screen 514 is entering the user interface 508. As seen in the user interface 508, both the active clone 504 and the inactive clone 506 are visible at the same time during the transition. Further, because active clone 504 has already been modified, the transition shows the incoming screen 514 with the updated value "TITLE2," while the exiting screen 510 displays the value "TITLE1."

Figure 7D:
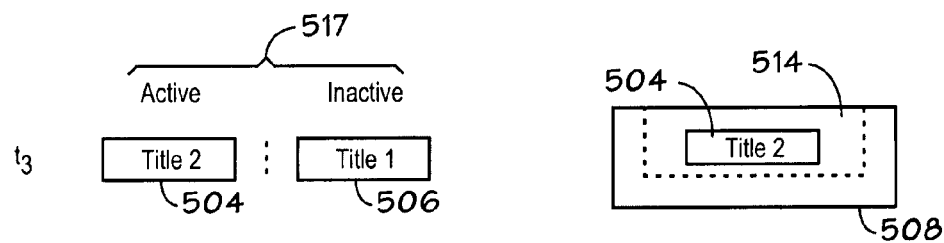

Referring now to FIG. 7D, at t3 the transition is complete and the target screen 514 is now fully displayed on the user interface 508. The target screen 514 is displayed with the updated UI components, such as the active clone 504 of the title component 507 with the updated value "TITLE2." At t3, the active clone 504 and inactive clone 506 are in memory with the property values "TITLE2" and "TITLE1" respectively.

Figure 7E:
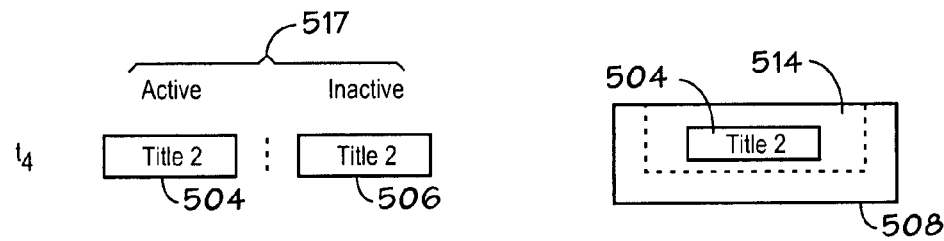

Finally, referring to FIG. 7E, at t4 the properties of the active clone 504 are applied to the inactive clone 506. Thus, inactive clone 506 now has the property value "TITLE2," thus returning the title component 507 to exist as two identical clones in memory. Further transitions may utilize the same technique shown in FIG. 6, with the formerly inactive clone 506 becoming the active clone and receiving the updated properties in preparation for a transition. Alternatively, the designations of active and inactive may simply be switched after completion of the transition such that the previously active clone is now inactive and the previously inactive clone is now active. Further, in some embodiments the application of the properties to each clone may occur simultaneously, such as during the execution of the transition.

To facilitate selection of a transition, an embodiment of the present technique may use the classification of user interface components for transition selection. For example, in an embodiment having the screen classifications discussed above, a transition may be determine based the screen classes of the target and/or previous screens. For each possible combination of target screen class and previous screen class, there are a number of possible transitions.

For example, FIG. 8 depicts a selection matrix 600 that may be used to select or designate a specific transition for any combination of screen class in accordance with an embodiment of the present invention. The row 602 and the column 604 of the matrix 600 depict the nine screen classes discussed above as included in one embodiment of the present invention. The cells of row 602 may represent an entering or target screen, and the cells of column 604 may represent an exiting or previous screen. Each cell in the matrix 600 where a screen class from row 602 and a screen class from column 604 intersect indicate the specific transition that may be used. Thus, for those cells in the matrix 600 that are at the intersection of identical screen classes, such as cell 608, no transition is present as there is no need to transition between identical screen classes.

Thus, different combinations of screen classes may have specified transition effects and types. For example, if the exiting or previous screen is classified background-full, as in block 610, and the entering screen is classified as menu-half, such as block 612, the transition selected is a slide. Thus, the entering screen, classified as a menu-half screen, will slide into the exiting screen, classified as a background-full screen. In another example, if the entering screen is a menu showcase, as in block 614, and exiting screen is classified as a foreground-full class, as in block 616, then the selected transition is a fade. Thus, for that transition, a menu showcase screen will fade in over a fading out foreground-full screen. Further, a pair of screen classes may have different transitions designated for the pair, depending on the direction of the transition. For example transitioning from a foreground-full screen class to a menu showcase screen class may be accomplished with a fade transition however, transitioning from the menu showcase screen class to the foreground-full screen class may be accomplished with a sliding transition.

For some possible transitions in the matrix 600, no specific transition may be specified, such as in cells 618. In these particular cases, a default transition may be used. If during the selection process, no transition is found in the selection matrix 600, the default or fallback transition will be used. The matrix 600 may be pre-populated during the design of the user interface or the matrix 600 may be populated or changed according to user preferences, allowing users to specify their preferred transitions. Alternatively, multiple selection matrices may be used, such as one for pre-populated selections, one for user preferred selections, one for further subclasses of screens, etc.

Figure 9:
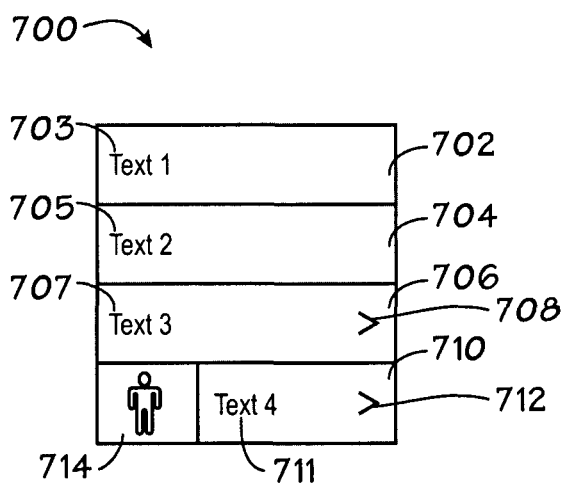
FIG. 9 depicts a simplified menu screen of a user interface depicting a list of items in accordance with an embodiment of the present invention.

As mentioned above in discussion of the user interface 20, menus may be one of the possible elements displayed in the user interface 20. For example, according to one embodiment of the user interface 20, screens displayed in the user interface 20 may include menus, in which each menu may comprise a list of items. Each list item may have a particular layout associated with that item, such that the layout specifies the position, size, and other properties of those components of the list item. For example, FIG. 9 depicts a simplified menu screen 700 of a user interface 20 showing a list of items. These list items may represent items selectable by the user or may also be items used to display information that are not selectable. Additionally, as will be discussed below, the items may include static or dynamic components. Beginning with the first item 702, this item includes text 706 shown as "TEXT1." The second item 704 in the list of the menu screen 700 includes text 705 displayed as "TEXT2." Thus, both items 702 and 704 include only text items, and a stored layout for those items need only store the layout of the text. The third item 706 includes both the text 707, displayed as "TEXT3," and a graphic 708, such as a bitmap, as illustrated by the arrow. Thus, the layout for item 706 may store the position, size, and other properties of the text and the graphic 708. The fourth item 710 in the list includes the text 711 ("TEXT4"), a graphic 712 represented by the arrow, and a dynamic, i.e. known only at runtime, item 714. Therefore, the layout for the item 710 may need to include the position, size, and other properties of the text 711, the graphic 712, and the dynamic item 714.

Figure 10:
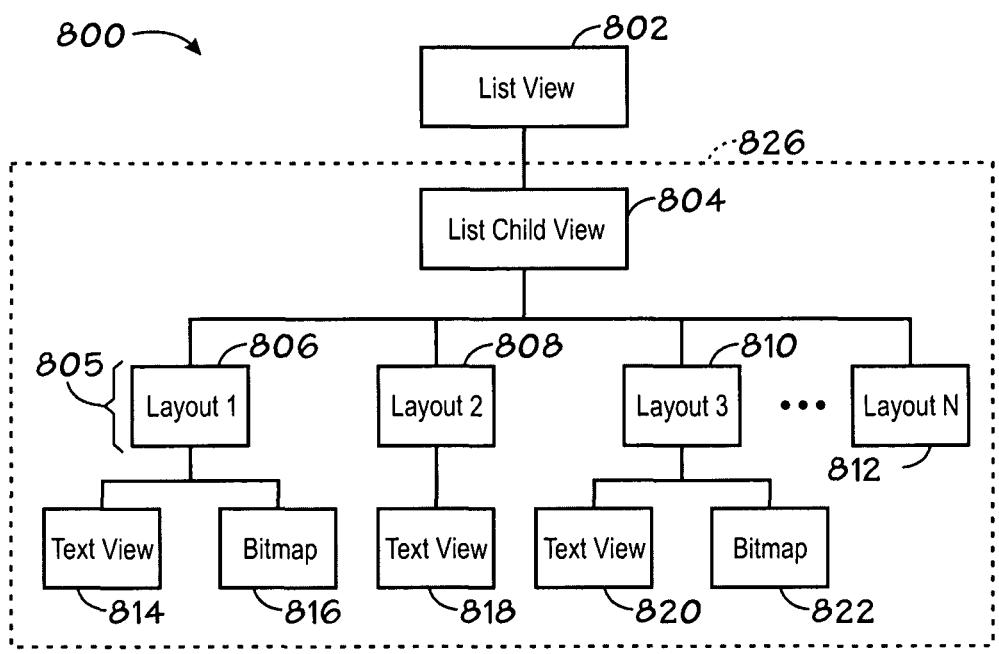
FIG. 10 is block diagram illustrating a classification of list item layouts and corresponding flyweight object in accordance with an embodiment of the present invention.

Because each item in a list may be different than other items, storing individualized layouts for each list item may result in increasing memory usage as the menus options increase. Such memory usage may be disadvantageously large in some embodiments of a portable electronic device 10 in which memory may be constrained due to the size of the device 10. FIG. 10 depicts a block diagram 800 showing a classification of list item layouts in accordance with an embodiment of the present technique that minimizes the memory usage of those list item layouts. The top of the block diagram 800 is a list view 802. Underneath the list view 802 is a list child view 804 that contains the list item layouts 805. All the possible list item layouts may be determined, and these are identified in FIG. 10 as layout1 806, layout2 808, layout3 810, and so on through layout "n" 812.

Each list item layout includes layout information for list item elements. For example, layout1 806 may include layout information for a text view 814 and a bitmap 816. Layout2 808 may include layout information for text view 818 only, whereas layout3 810 may include that information for a text view 820 and a bitmap 822. Thus, layouts may be specified for various elements of the list items, so that the list items may be displayed such as in the embodiment depicted in FIG. 9.

Additionally, list items may be associated with layouts dynamically at the time a list item is rendered. For example, the renderer for a list item can request a layout from software, such as from a model. The model can return a layout to the renderer, and the list item will use that layout. Thus, in some embodiments, the layout can be dynamically based on a status, condition, or other data. For example, if a media file stored on the device 10 has not been played by a user, at the time the list item is rendered a list item may use layout1 806. If the media file stored on the device 10 has already been played by a user, then at the time the list item is rendered, the same list item may use layout3 810.

In accordance with an embodiment of the present invention, list item layouts may be defined inside an object 826. In one implementation, the object may be a flyweight object, wherein the flyweight object is shared among multiple contexts simultaneously. In each context, the flyweight object acts as an independent object, may be used the same as an instance of an independent object. The flyweight object 826 minimizes the total memory usage of storing a layout, and allows any number of items with the same layout to share the memory cost of the layout. Further, dynamic list items may be displayed, next to static list items.

For example, a menu list item that includes a text view and a bitmap may refer to the layout1 806 for layout information. A second menu list item that includes a text view and a bitmap may also refer to layout1 806 for layout information. Thus, instead of storing a list item layout for each list item, list items may refer to the same layout information stored in the flyweight object 826. Further, because all possible list item layouts for the device 10 may be determined and stored in the flyweight object 826, any list item may refer to the layouts in the flyweight object to obtain layout information.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of displaying graphics on an electronic device, comprising:
    displaying an element of a user interface via a graphics layer attached to a software renderer of the electronic device;
    detaching the graphics layer from the software renderer of the electronic device when an operation on the graphics layer is more efficiently executed in one or more of a plurality of hardware layers of the electronic device than the software renderer of the electronic device; and attaching the graphics layer to the one or more hardware layers of the electronic device, wherein at least two of the hardware layers are dedicated to performing different operations such that the graphics layer is attached to a respective hardware layer based on the operation to be performed on the graphics layer.

2. The method of claim 1, comprising facilitating the display of one or more features using at least one of the plurality of hardware layers.

3. The method of claim 2, wherein facilitating the display of the one or more features comprises changing opacity, moving, resizing, rotating, blurring, pseudocoloring, or any combination thereof.

4. The method of claim 1, wherein attaching the graphics layer comprises performing a color format conversion, recalculating coordinates for a plurality of objects of the user interface, converting from a first pixel format to a second pixel format or any combination thereof.

5. The method of claim 1, wherein the plurality of hardware layers include a first hardware layer that comprises hardware rotators that rotate the graphics layer when the graphics layer is attached to the first hardware layer.

6. The method of claim 1, wherein the plurality of hardware layers include a first hardware layer dedicated to changing opacity of the graphics layer when the graphics layer is attached to the first hardware layer.

7. The method of claim 1, wherein the plurality of hardware layers include a video hardware layer dedicated to the display of video when the graphics layer is attached to the video hardware layer.

8. A method of displaying graphics on an electronic device, comprising:
displaying an element of a user interface via a graphics layer attached to one or more of a plurality of hardware layers of the electronic device, wherein the plurality of hardware layers comprise two or more hardware layers dedicated to performing different operations and wherein the graphics layer is attached to a respective hardware layer based on the operation to be performed on the element of the user interface when the operation on the element of the user interface is more efficiently executed in the respective hardware layer than a software renderer of the electronic device;
detaching the graphics layer from the one or more of the plurality of hardware layers of the electronic device; and
attaching the graphics layer to the software renderer of the electronic device.

9. The method of claim 8, comprising facilitating the display of one or more features using at least one of the plurality of hardware layers.

10. The method of claim 9, wherein the one or more features comprises changing opacity, rotating, resizing, moving, blurring, pseudo-coloring, or any combination thereof.

11. The method of claim 8, wherein attaching the graphics layer comprises performing a color format conversion, recalculating coordinates for a plurality of objects of the user interface, converting from a first pixel format to a second pixel format, or any combination thereof.

12. The method of claim 8, comprising applying one or more features to a plurality of elements of the user interface.

13. An electronic device, comprising:
a display;
a processor coupled to the display and configured to provide a plurality of hardware layers; and a user interface comprising a plurality of graphics layers, wherein display of at least one graphics layer of the plurality of graphics layers is facilitated by one or more features of at least one of the plurality of hardware layers, wherein the at least one graphics layer dynamically attaches to and detaches from at least one of the plurality of hardware layers based on specialized functionality performed by a respective hardware layer that is not performed by a different hardware layer;
wherein the processor is capable of receiving an operation to be performed on a selected graphics layer; and
wherein the processor attaches the selected graphics layer to one or more of the hardware layers when the processor determines that operation on the graphics layer is more efficiently executed in the one or more plurality of hardware layers.

14. The electronic device of claim 13, wherein the electronic device comprises at least one of a media player, a cellular phone, or a personal data organizer, or any combination thereof.

15. The electronic device of claim 13, wherein the display comprises an LCD and wherein the plurality of hardware layers comprises a plurality of LCD controller registers.

16. The electronic device of claim 13, comprising a software renderer, and wherein the software renderer comprises a software compositing pipeline.

17. The electronic device of claim 13, wherein the display comprises a touch screen, and wherein the user interface is displayed on the touch screen.

18. The electronic device of claim 13, wherein the one or more of the plurality of hardware layers are dynamically selected for attachment based on the one or more features.

19. The electronic device of claim 13, wherein the one or more features comprises changing opacity, rotating, resizing, moving, blurring, pseudo-coloring, or any combination thereof.

20. A method for performing display operations, comprising:
determining a graphics operation to be performed on a graphics layer of an interface of an electronic device, wherein the graphics operation comprises one of a rotation or an opacity change; and
dynamically switching between software and hardware rendering of the graphics layer, wherein the dynamic switching comprises attaching the graphics layer to a respective hardware layer dedicated to performing the graphics operation when the operation on the graphics layer is more efficiently executed by hardware rendering than software rendering; and
performing the graphics operation using the hardware rendering.

21. The method of claim 20, wherein the graphics operation comprises changing the opacity of, resizing, rotating, moving, blurring, or pseudo-coloring the graphics layer.

22. An electronic device, comprising:
a display; and
a processor coupled to the display and configured to render a graphics layer on the display and switch between software-based rendering and hardware-based rendering based on an operation performed on the graphics layer;
wherein hardware-based rendering is selected when the operation performed on the graphics layer is more efficiently executed by hardware-based rendering than software-based rendering;
wherein the hardware-based rendering is performed by two or more hardware layers that each perform different graphics operations; and such that the operation to be performed on the graphics layer determines which hardware layer is used in the hardware-based rendering.

23. The electronic device of claim 22, wherein the processor renders the graphics layer using hardware-based rendering during a transition to another graphics layer.

* * * * *